(12) United States Patent
Herrmann et al.

(10) Patent No.: US 8,167,105 B2
(45) Date of Patent: May 1, 2012

(54) PRESSURE MEDIUM-ACTUATED CONTROL DEVICE OF AN AUTOMATED STEP-BY-STEP VARIABLE SPEED TRANSMISSION

(75) Inventors: Markus Herrmann, Scheidegg (DE); Thomas John, Sulzheim (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 541 days.

(21) Appl. No.: 12/443,931

(22) PCT Filed: Oct. 1, 2007

(86) PCT No.: PCT/EP2007/060355
§ 371 (c)(1),
(2), (4) Date: Apr. 1, 2009

(87) PCT Pub. No.: WO2008/040693
PCT Pub. Date: Apr. 10, 2008

(65) Prior Publication Data
US 2009/0291802 A1    Nov. 26, 2009

(30) Foreign Application Priority Data
Oct. 2, 2006    (DE) .................. 10 2006 046 710

(51) Int. Cl.
*F16D 48/06*    (2006.01)
(52) U.S. Cl. ............... 192/48.601; 192/3.58; 192/85.63
(58) Field of Classification Search ............... 475/116, 475/119, 120, 127; 477/143, 180, 155, 158, 477/164, 906; 74/730.1, 731.1; 192/3.58, 192/85.63, 85.01, 48.601
See application file for complete search history.

(56) References Cited

U.S. PATENT DOCUMENTS

| 5,438,887 | A | 8/1995 | Simmons |
| 6,702,702 | B2 * | 3/2004 | Godecke ................. 475/132 |
| 2002/0155920 | A1 | 10/2002 | Agner |
| 2005/0043141 | A1 | 2/2005 | Neuner |
| 2007/0170031 | A1 | 7/2007 | Kohlhaas et al. |
| 2008/0047795 | A1 | 2/2008 | Gierer et al. |
| 2010/0120583 | A1 * | 5/2010 | Fritzer ................. 477/158 |

FOREIGN PATENT DOCUMENTS

| DE | 10210612 | | 3/2002 |
| DE | 10134115 | A1 | 1/2003 |
| DE | 10338355 | A1 | 8/2003 |
| DE | 102004020569 | | 4/2004 |
| DE | 102004033362 | | 7/2004 |
| EP | 1522754 | | 4/2005 |
| GB | 2284026 | | 5/1995 |
| WO | WO 2005106291 | A2 * | 11/2005 |
| WO | WO 2007045400 | A1 * | 4/2007 |
| WO | WO 2007045401 | A1 * | 4/2007 |

* cited by examiner

*Primary Examiner* — David D Le
*Assistant Examiner* — Lillian Nguyen
(74) *Attorney, Agent, or Firm* — Davis & Bujold, P.L.L.C.

(57) ABSTRACT

A pressure medium-actuated control device of an automated step-by-step variable speed transmission. The device having a control valve for controlling an actively engaged disconnectable type clutch which is disposed along a power flow path between a motor and a transmission input shaft, and a self-retaining valve located in the pressure supply of the clutch control valve for a rotational speed-dependent emergency actuation of the disconnectable type clutch. An electrical switch-off actuator is connected to the self-retaining valve such that the valve piston, of the self-retaining valve, can be moved into an idle position to lock the pressure supply of the clutch control valve in a powered state of the switch-off actuator, and into an operating position determined by the applied control pressures in the power-off state of the switch-off actuator.

10 Claims, 4 Drawing Sheets

PRESSURE MEDIUM-ACTUATED CONTROL DEVICE OF AN AUTOMATED STEP-BY-STEP VARIABLE SPEED TRANSMISSION

This application is a National Stage completion of PCT/EP2007/060355 filed Oct. 1, 2007, which claims priority from German patent application serial no. 10 2006 046 710.8 filed Oct. 2, 2006.

FIELD OF THE INVENTION

The present invention relates to a pressure medium-activatable control device of an automated step-by-step variable speed transmission, with a selectable clutch control valve for controlling a clutch control cylinder of an actively engagable disconnection type clutch disposed in a flow of power between a drive motor and an input shaft of the step-by-step variable speed transmission, and with a self-retaining valve disposed in the pressure supply branch of the clutch control valve for the rotational speed-dependent emergency activation of the disconnection type clutch.

BACKGROUND OF THE INVENTION

Different designs of automated transmissions (ASG) have long been constructed as an automated transmission with a single disconnection type clutch as well as constructed as an automated dual-clutch transmission (DKG) with two decoupler type clutches respectively allocated to one of two gear trains, which are also used in production vehicles. The control device of an automated transmission comprises gear actuators, like gear regulators for engaging and disengaging gears and a clutch actuator for engaging and disengaging a decoupler type clutch disposed in the flow of power between the internal combustion engine and the transmission input shaft, as well as control elements for controlling the gear actuators. Similarly, the control device of an automated dual-clutch transmission comprises gear actuators for each of both gear trains, like gear regulators for engaging and disengaging the allocated gears and a clutch actuator for engaging and disengaging a disconnection type clutch disposed in the flow of power between the internal combustion engine and the transmission input shaft, as well as control elements for controlling the gear actuators.

As a result of the energy density, good control properties and availability of technically advanced components, the control devices of automated transmissions and automated dual-clutch transmissions are mostly constructed hydraulically, which means that the corresponding speed selectors and clutch actuators are constructed as hydraulic control cylinders and the allocated control elements as hydraulic selector or control valves.

The selector and control valves can be executed as solenoid valves, and can be directly controlled via an electric control current in this design. As this, however, requires correspondingly strong solenoid valves of relatively large dimensions and comparatively large weights as well as relatively high electrical control currents, the selector and control valves are preferably constructed as pressure-actuated, and in this design mostly controllable as pilot valves constructed as smaller solenoid valves.

In particular, in the case of heavy commercial vehicles, which are equipped with a pneumatic pressure supply device for the power supply, a pneumatic configuration of control devices of corresponding step-by-step variable speed transmissions with a largely identical layout and mode of operation is alternatively possible. Therefore, the present invention likewise comprises pneumatic control devices, even if herein after only hydraulic control devices will be mentioned for the sake of achieving uniform wording.

A hydraulically activatable decoupler type clutch of an automated step-by-step variable speed transmission (ASG, DKG) can be executed as a wet multi-disk clutch or as a single-disk or multi-disk dry clutch. The decoupler type clutch is usually constructed actively engagable so that it can be engaged by feeding hydraulic pressure medium via the allocated clutch control valve into the pressure chamber of the clutch control cylinder and be disengaged via the discharge of the pressure medium from the pressure chamber and/or by the depressurization of the pressure chamber of the clutch control cylinder via the clutch control valve. In consequence, the decoupler type clutch will open in case of a disturbance in the allocated control device due to an interruption of the allocated control signal, in particular, of the control pressure of the allocated pilot valve because of the associated unpressurized shifting of the pressure chamber of the control clutch cylinder.

In a vehicle equipped with an automatic transmission with only one decoupler type clutch, in the event of a disturbance while the vehicle is standing still the vehicle is prevented from starting, and in the event of disturbance while the vehicle is moving, the vehicle is forced to coast. Although this control behavior of the control clutch is advantageous in most driving situations, in certain cases, like for example a vehicle stop in a danger area, when driving on an expressway with dense traffic and at high speed, or when driving along an extended incline, this can lead to undesirable situations.

A corresponding hydraulic control device of a dual-clutch transmission is, for example, known from DE 101 34 115 A1. For each of the two gear trains, this control device has an independent control circuit with gear regulating valves for controlling two pressure chambers of several gear regulators, with a multiplex valve for connecting both gear regulating valves to each of the gear regulators, and a clutch control vale for controlling the allocated decoupler type clutch. Both control circuits can respectively be connected to and/or depressurized and separated from the main pressure line via an own safety valve, respectively constructed in that description as a 3/2-way solenoid switching valve. In case of a one-gear disturbance involving only one control circuit, the corresponding control circuit can be depressurized by disconnecting the allocated safety valve, as a result of which the allocated gear train is put out of operation by disengaging the corresponding decoupler type clutch. Driving can than be continued in emergency operation via the other gear train, however, taking into account large gear transitions, whereby each shifting process is associated with traction force interruptions, so that leaving the danger area and reaching a repair shop can at least be possible. If, however, a main disturbance involving both gear trains and/or a superordinate electronic transmission control (EGS) occurs, both safety valves are disconnected and thus both gear trains put out of operation by disengaging the decoupler type clutches. This necessarily results in a vehicle breakdown which can only be acted upon to a limited extent by the driver with the already mentioned disadvantages.

In order to avoid this unfavorable control behavior in the event of a disturbance, a hydraulic control device of an automated step-by-step variable speed transmission (ASG+DKG) is provided in DE 10 2604 020 569 A1 having a self-retaining valve disposed in the pressure supply branch of the clutch control valve for the rotational speed-dependent emergency actuation of the decoupler type clutch. Apart from a control pressure that is available during normal operation, the self-retaining valve is also acted upon by a permanently available rotational speed-dependent control pressure, which in an offset operating position conveys an activation control pressure to an activation valve. The activation valve is likewise kept in an offset operation position by a control pressure that is available during normal operation, whereby the activation pressure conveyed is shut off in this position. In case of a disturbance, the control pressures that are available during normal operation drop or at least strongly decrease. As a result of this, the activation valve is placed in idle position by means of a valve spring, where the activation pressure is conveyed further into a front side pressure chamber of the clutch control valve facing away from the spring. Thus, the clutch control valve is kept in an operating position or is moved into it, where the pressure chamber of the clutch control cylinder is acted upon with an operating pressure, and the decoupler type clutch is thus kept engaged and/or is disengaged, as a result of which further driving of the vehicle in the emergency operation is possible.

This retaining function of the decoupler type clutch is, however, only available with a sufficiently high rotational speed-dependent control pressure, which can be proportional to the speed of the drive motor, or proportional to the speed of the transmission output shaft and so to the vehicle speed. If the rotational speed-dependent control pressure is below a predetermined threshold value, by means of its valve spring the self-retaining valve will go to the idle position, in which the activation pressure is locked. Without the application of the activation pressure, the clutch control valve, however, also goes to its idle position, in which the pressure chamber of the valve control cylinder is depressurized and the disconnection type clutch is thus be opened. In consequence, it is advantageously ensured that a motor stall associated with the disturbance of safety-relevant servo drives, like possibly of a negative pressure-driven brake force booster or a mechanically driven servo pump of a servo steering mechanism, is avoided, and that coasting, which the driver can only act upon to a limited extent, is made possible.

In addition, in the corresponding control device of a dual-clutch transmission, a clutch selector valve downstream of the activation valve and acted upon in the opposite direction of the operating pressures facilitates conveying the activation pressure put through by the activation valve only to the clutch control valve of the clutch control cylinder acted upon with the higher operating pressure at the moment of the disturbance. The outcome is that the decoupler type clutch, which is still engaged at the moment of the disturbance, is completely engaged and subsequently kept engaged, and the other decoupler type clutch is completely disengaged as long as the speed of the drive motor and/or of the output shaft of the dual-clutch transmission is sufficiently high.

Despite the advantageous functional advantages of the above described control device, an improvement regarding the possibility of engaging a gear in the engaged idle position N exists. Thus, in certain driving situations of vehicles equipped with automated step-by-step variable speed transmissions acceleration of the impending shifting processes is desirable, as with multiple changes between the reverse position R via the idle position N to the forward position D, or when changing from the idle position N to the forward position D, engaging one gear in the already engaged idle position N in an automated transmission, and possibly engaging two gears in an automated dual-clutch transmission (DKG).

If, for example, shifting to and fro between the reverse position R and the forward position D is recorded by corresponding sensors when the vehicle is standing still or moving at very low speed, as a result of which a free rocking motion of the vehicle, e.g. in the snow or marshes, is detected, the corresponding shifting processes can be significantly accelerated by engaging both gears (R, G1) in an automatic transmission by engaging the reverse gear R or first gear G1, and in an automatic dual-clutch transmission by the usual allocation of the reverse gear R and first gear G1 to different gear trains, as, once the respective position (R or D) for accomplishing the forward thrust of the vehicle by the selector lever is reached, only the decoupler type clutch has to be engaged in an automated transmission, and only one of both decoupler type clutches has to be engaged in the automatic dual-clutch transmission.

Likewise, when an impending sportive racy start-up of an automatic dual-clutch transmission is requested by the driver, the starting process can be considerably accelerated with the usual allocation of the first gear G1 and the second gear G2 to different gear trains by already engaging both gears (G1, G2) with the still engaged idle position N, as only the decoupler type clutch of the start-up gear G1 has to be engaged in the first instance when the gear position D is engaged, and subsequently the power flux can rapidly be diverted to the second gear G2 by an overlapping actuation of both decoupler type clutches.

A further driving situation, in which the engagement of a gear with disengaged idle position N is advantageous, is so called gliding and/or coasting, in which the driver accelerates the vehicle to a certain speed, and the vehicle subsequently coasts with engaged idle position N or at least disengaged drive clutch. In this coasting phase, the driver can, however, return to the forward position D and/or engage the drive clutch at any time, and demand a more or less high propulsive performance. If a gear corresponding to the current speed is already engaged, the decoupler type clutch only has to be engaged in an automated transmission, and the only decoupler type clutch of the involved gear train has to be engaged in an automatic dual-clutch transmission, as a result of which a very rapid vehicle response is ensured. However, to be able to engage a gear in disengaged idle position N, it must at any rate be ensured that in case of a disturbance in the electronic transmission control (EGS) or in an element of the hydraulic control device, the decoupler type clutch involved is not inadvertently engaged.

Against this background, it is the object of the present invention to propose a hydraulic control device of an automated step-by-step variable speed transmission of the above mentioned type, which is improved with regard to enabling a safe idle gear engagement, constructed as simple and cost-effective as possible and without functional restrictions.

Therefore, according to the characteristics of the main claim, the present invention proceeds from a pressure medium-actuated, i.e. hydraulically or pneumatically actuated control device of an automated step-by-step variable speed transmission (automated transmission or automatic dual-clutch transmission), with a selectable clutch control valve for controlling a clutch control cylinder of an actively engageable decoupler type clutch disposed in the power flux between the drive motor and the input shaft of the step-by-step variable speed transmission, and having a self-retaining valve disposed in the pressure supply branch of the clutch control valve for the rotational speed-dependent emergency actuation of the decoupler type clutch. In order to attain this object, an electrically selectable disconnection actuator is provided, which is constructed and operatively connected to the self-retaining valve such that the valve piston of the self-retaining valve can be moved into an idle position locking the pressure supply of the clutch control valve in the powered state of the switch-off actuator, and into an operating position determined by the applied control pressures in the powered-off state of the disconnection actuator.

By supplying the relatively simply and cost-effectively configurable disconnection actuator with current, the hydraulic control device of the valve piston of the self-retaining valve is displaced to its idle position during normal operation, and thus a supply pressure $P\_1$ conveyable to the clutch control valve or a control pressure conveyable by the self-retaining valve, by means of which the conveyance of the supply pressure $P\_V1$ can be controlled via another control valve, is locked, and the corresponding connection line depressurized. By omitting the supply pressure $P\_V1$ in the corresponding clutch control cylinder, the allocated decoupler type clutch is necessarily disengaged or, if it is already in the disengaged state, is held securely disengaged. In this operating situation, with the idle position N engaged, in particular for acceleration of impending shifting processes, one gear can be engaged in an automatic transmission, and up to two gears can be engaged in an automatic dual-clutch transmission without the possibility that, in case of a disturbance in the hydraulic control device, or in the allocated electronic transmission control (EGS), a decoupler type clutch can unintentionally be engaged.

To terminate this operating situation the switch-off actuator is again switched off, whereby the valve piston of the self-retaining valve again returns to the operating position taken before switching on the disconnection actuator under the impact of available control pressures, in particular of a control pressure $P\_Nor$ that is available during normal operation, and thus the self-retaining valve goes to the previous operating state previously overdriven by the disconnection actuator.

If, however, the hydraulic control device is already operating in emergency operation, where all electrically controllable control elements of the hydraulic control device are in the power-off state, the disconnection actuator can no longer be activated. From this, there results in that in emergency operation, the corresponding functionalities, like engaging a gear in an engaged idle position N, are no longer available.

The switch-off actuator can be constructed as a hydraulic solenoid switching valve, e.g. as a 3/2-way switching valve, with a connection of a switching pressure supply line conveying a reduction pressure $P\_Red$, with a connection of a control pressure line connected to a front side pressure chamber of the self-retaining valve containing the valve spring, and with a connection of a depressurized line, by means of which the switching pressure is connected to the depressurized line in the power-off state and to the control pressure supply line in the powered state. It goes without saying that in this case the switch-off pressure $P\_Abs$ through-switchable via the solenoid switching valve, which largely corresponds to the reduction pressure $P\_Red$, is higher than the maximum required switching pressure of the self-retaining valve and/or that the through-switchable switch-off pressure $P\_Abs$ of the solenoid switching valve as well as that the spring constant of the valve spring and the pressurized active surfaces of the valve piston of the self-retaining valve are dimensioned such that the pressure and spring forces acting together with the switch-off pressure $P\_Abs$ upon the valve piston in the engagement direction in each case are higher than the maximum pressure forces acting upon the valve piston in the opening direction.

As an alternative, the disconnection actuator can, however, also be constructed as a hydraulic solenoid control valve, e.g. as a 3/2-way control valve or as a 3/3-way control valve, with a connection of a control pressure supply line conveying a reduction pressure $P\_Red$, with a connection of a control pressure line connected to a front side pressure chamber of the self-retaining valve containing the valve spring, and with a connection of a depressurized line, by means of which the switching pressure line is connected in the power-off state, and to the control pressure supply line in the powered state. In this connection, it is provided that the maximum switch-off pressure $P\_Abs\_max$ adjustable via the solenoid control valve, which largely corresponds to the reduction pressure $P\_Red$, is higher than the maximum required switching pressure of the self-retaining valve and/or that the maximum adjustable switch-off pressure $P\_Abs\_max$ of the solenoid control valve as well as the spring constant of the valve spring and the pressurized active surfaces of the valve piston of the self-retaining valve are dimensioned such that the pressure and spring forces acting together with the switch-off pressure $P\_Abs$ upon the valve piston in the engagement direction in each case are higher than the maximum pressure forces acting upon the valve piston in the disengagement direction.

In the construction of the switch-off actuator as a solenoid control valve, at least one further switching pressure line leading to another hydraulically controllable switching control element can be connected to the switching pressure line or directly to the connection of the switching pressure line of the solenoid control valve, whereby the switching pressures of the self-retaining valve and of the other switching control element are conveniently of different height.

In this way, three control states for the disconnection actuator and/or the solenoid control valve result; a first control state, in which both switching control elements are not commutated, a second control state, in which only one of both switching control elements is commutated, and a third control state, in which both switching control elements are commutated.

In order to achieve a relatively simple and effective layout, in a preferred embodiment the self-retaining valve is provided with a concentric pressure chamber, which on the spring side has a controllable connection of a supply line conveying a supply pressure $P\_V1$, which concentrically has a connection of a connection line leading to the supply connection of the clutch control valve, and which has a controllable connection of a depressurized line on the side facing away from the spring, and which concentrically has a further a control pressure line that during normal operation conveys a control pressure $P\_N$, and which is restricted by a larger active surface of an adjacent piston collar on the spring than on the side facing away from the spring, and with a front-side pressure chamber containing the valve spring, which has a connection of the switching pressure line leading to the disconnection actuator, as well as with a front-side pressure chamber facing away from the valve spring, which has a closable connection of a control pressure line conveying a rotational speed-dependent control pressure $P\_D$.

By means of the hereby provided direct conveyance of the supply pressure $P\_V1$ through the self-retaining valve, an activation valve provided in the control device according to DE 10 2004 020 569 A1 can advantageously be spared. The above described resetting function of the valve piston via the control pressure $P\_Nor$ after switching off the disconnection actuator is performed in this case by the different size of the active surfaces of the adjacent piston collars that limit the corresponding pressure chamber. Here, the respective connection is controlled, i.e. opened and closed, in the manner known per se via a control edge of an adjacent piston collar of the valve piston on the spring side or on the side facing away from the spring.

In order to increase the functional reliability of the disconnection function of the disconnection actuator the self-retaining valve can additionally be provided with a further concentric pressure chamber, via which a control pressure supply line conveying the reduction pressure P_Red can be connected to a control pressure supply line leading to a front side pressure chamber of the clutch control valve facing away from the valve spring and provided with a locking element, the pressure chamber having a controllable connection of the control pressure supply line on the spring side, concentrically a connection of the control pressure supply line, and a controllable connection of a depressurized line on the side facing away from the spring.

While allowing for a correspondingly higher constructive expenditure for the self-retaining valve in the powered state of the disconnection actuator, besides the supply pressure P_V1, the reduction pressure P_Red, which in the operating mode is conveyed as emergency pressure to the front-side pressure chamber of the clutch control valve via the locking element, is likewise shut off.

As an alternative to the above described both embodiments of a single self-retaining valve, two pressure controlled self-retaining valves can also be provided, of which the first self-retaining valve is provided with a concentric pressure chamber, which on the spring side has a controllable connection of a supply line conveying the supply pressure P_V1, which concentrically has a connection of a supply pressure connection line leading the supply connection of the clutch control valve, and which on the side facing away from the spring has a controllable connection of a depressurized line, whereby the pressure chamber is restricted on the spring side by the active surface of an adjacent piston collar that is larger than on the side facing away from the spring, as well as with a front side pressure chamber containing the valve spring, which has a connection of the switching pressure line leading to the switch-off actuator, and with a front-side pressure chamber facing away from the valve spring, which has a controllable connection of a control pressure line conveying a control pressure P_Nor during normal operation, which is restricted by the control edge of an adjacent piston collar on the spring side.

The second self-retaining valve is provided with a concentric pressure chamber, via which a control pressure supply line conveying the reduction pressure P_Red can be connected to a control pressure connection line leading to a front side pressure chamber of the clutch control valve facing away from the valve spring and provided with a locking element, whereby this pressure chamber has a controllable control pressure supply line on the spring side, concentrically a connection of the control pressure supply line, and a controllable connection of a depressurized line on the side facing away from the spring, as well as with a font side pressure chamber facing away from the valve spring, which has a controllable connection of a control pressure line conveying a rotational speed-dependent control pressure P_D.

In this variant, both self-retaining valves are executed in a relatively simple and space saving manner. The first self-retaining valve is used for conveying and shutting off the supply pressure P_V1, whereby the corresponding valve piston is displaced via the control pressure P_Nor available during normal operation to an operating position with open conveyance of the supply pressure P_V1, and in case of a disturbance, i.e. when the control pressure P_Nor is not available, kept in the current operating position by the supply pressure P_V1 via the active surfaces of different sizes of the adjacent piston collars.

If necessary, however, the valve piston can be displaced to the idle position with shut off conveyance of the supply pressure P_V1 by supplying the disconnection actuator with current by means of the switch-off pressure P_Abs then active in the switching pressure line largely corresponding to the reduction pressure P_Red.

The second self-retaining valve is used for conveying the reduction pressure P_Red to the locking element and from there in emergency operation as emergency control pressure P_Not on to the front side pressure chamber of the clutch control valve. In case of a disturbance, i.e. when the control pressure P_Nor is not available, the corresponding connection is only kept open by the front side application of the rotational speed-dependent pressure P_D to the valve piston when the speed of the drive motor or of the output shaft of the step-by-step variable speed transmission is sufficiently high, and shut off when the speed is too low. Thus, both self-retaining valves together approximately fulfill the same scope of functions as the previously described embodiments of a single, clearly more complex and expensive self-retaining valve.

The locking element provided for conveying the reduction pressure P_Red and/or emergency control pressure P_Not to the clutch control valve in emergency operation is preferably constructed as an emergency valve, which is provided with a concentric pressure chamber, which has a controllable connection of a depressurized line on the spring side, which concentrically has a connection to the control pressure supply line leading to the clutch control valve, and which has a controllable connection of the control pressure line coming from the control pressure supply line or from the self-retaining valve facing away from the spring, as well as with a front-side pressure chamber facing away from the valve spring, which is restricted by an active surface of a piston collar on the spring side and has a connection of a control pressure line conveying a control pressure P_Nor during normal operation.

By means of this emergency valve, it is possible that the valve piston of the emergency valve is displaced to an operating position during normal operation by the application of the control pressure P_Nor, in which the conveyance of the reduction pressure P_Red to the clutch control valve is shut off, and that in emergency operation, i.e. when the control pressure P_Nor is not available, the valve piston is shifted to its idle position by the restoring force of the valve spring, in which the conveyance of the reduction pressure P_Red as emergency control pressure P_Not to the clutch control valve is open. Thus, the emergency operation is activated via the depressurization of the font side pressure chamber of the emergency valve and the consequently induced conveyance of the reduction pressure P_Red, thus converted to emergency pressure P_Not, to the clutch control valve.

For triggering emergency operation, an electrically controllable operation switch actuator, by means of which the control line conveying the control pressure P_Nor to the self-retaining valve and/or to the emergency valve during normal operation can be supplied with the control pressure P_Nor in the powered state of the operation switch actuator and depressurized in the power-off state of the operating switch actuator.

The operation switch actuator can be constructed as a hydraulic solenoid switching valve, e.g. as a 3/2-way switching valve, with a connection of the control pressure supply line, with a connection of a control pressure line of the self-retaining valve conveying the control pressure P_Nor during normal operation and/or of the emergency valve, and with a connection of a depressurized line, by means of which the control pressure line is connected to the depressurized line in the power-off state and to the control pressure supply line in the powered state. The control pressure P_Nor available during normal operation thus corresponds to the reduction pressure P_Red available in the control pressure supply line.

Likewise, the operation switch actuator can be constructed as a hydraulic solenoid control valve, e.g. as a 3/2-way control valve or as a 3/3-way control valve, with a connection of the control pressure supply line, with a connection of a control pressure line of the self-retaining valve conveying the control pressure P_Nor during normal operation and/or of the emergency valve, and with a connection of a depressurized line, by means of which the control pressure line can be connected to the depressurized line in the power-off state and to the control pressure supply line in the powered state. Here the self-retaining valve and the emergency valve can be commutated in series by the solenoid control valve if they have different switching pressures.

Basically, in a dual-clutch transmission with two disconnection type clutches for controlling the clutch control cylinder with a separate execution of the control branches, the constructions and control elements of the control device according to the present invention thus far described can be used in double version. As, however, the expenditure in control elements is inconveniently high in this case, a combined control of both clutch control cylinders that can be implemented by means of a clutch selector valve appears to be more advantageous.

For this purpose, a pressure-actuated clutch selector valve is preferably provided, whose valve piston is spring centered and acted upon in the opposite effective direction by the operating pressures conveyed by both clutch control cylinders via the connection lines, and which has two pressure chambers, each of which has an axial outer controllable connection of the control pressure connection line conveying the emergency control pressure P_Not in case of an emergency operation, an axial inner connection of a depressurized line, and in between a connection respectively leading via a control pressure connection line to the front-side pressure chamber facing away from the valve spring of one of both clutch control valves, whereby the connections of the control pressure connection lines are respectively disposed axially on the side determined by the effective direction of the allocated operating pressures.

The clutch selector valve constructed this way ensures that the reduction pressure P_Red available in case of a disturbance conveyed by the emergency valve as emergency control pressure P_Not, is only conveyed to the clutch control valve of the disconnection type clutch that is still engaged at the moment of the disturbance, as a result of which this disconnection type clutch is engaged or kept engaged, and the other disconnection type clutch is disengaged. This advantageously ensures that both disconnection type clutches can not be simultaneously engaged, as a result of which the vehicle would be locked with gears engaged in both gear trains. Since as at least the self-retaining valve, the emergency valve and the allocated supply and control pressure lines are only necessary in a single version, this embodiment of the control device according to the present invention represents a considerable advantage in terms of costs and installations space.

BRIEF DESCRIPTION OF THE DRAWINGS

Drawings of an exemplary embodiment are attached to the description for the purpose of exemplification of the present invention, wherein.

DETAILED DESCRIPTION OF THE DRAWINGS

Figure 1:
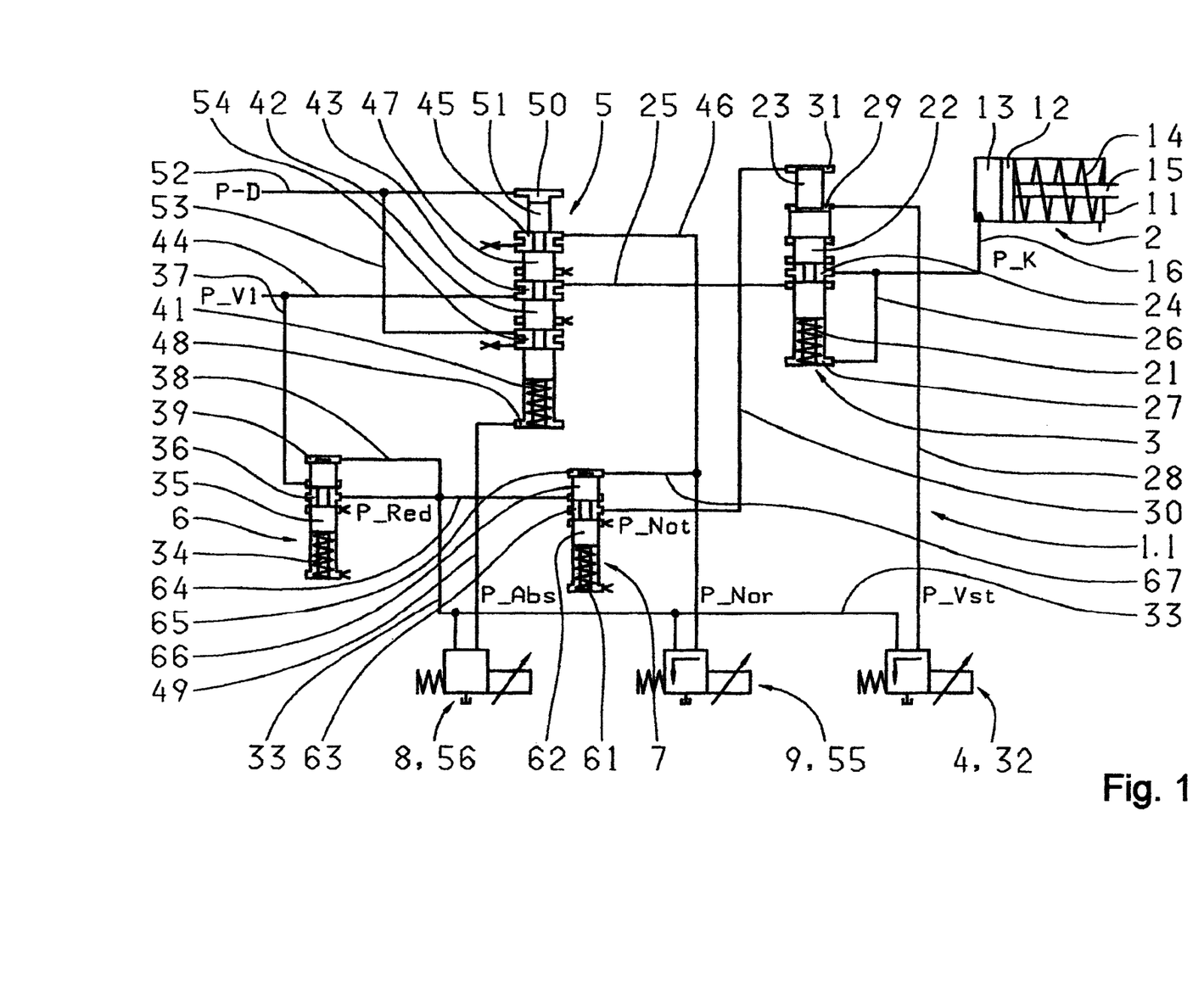
FIG. 1 shows an embodiment of a control device according to the present invention for controlling a single disconnection type clutch in the drive train.

In FIG. 1, a hydraulic control device 1.1 according to the present invention of an automated step-by-step variable speed transmission has a clutch control cylinder 2, a clutch control valve 3, a pilot valve 4, a self-retaining valve 5, a pressure reduction valve 6, an emergency valve 7, a disconnection actuator 8 and an operation switch actuator 9.

The clutch control cylinder 2 comprises a cylinder barrel 11 and an axially movable piston 12, which on one side is restricted by a pressure chamber 13 acted upon by an operating pressure P_K, acted upon with a restoring force by a return spring 14 on the opposite side, and operatively connected via a piston rod 15 to an actively engageable disconnection type clutch, which is not shown. By conveying a pressure medium at a sufficiently high operating pressure P_K via an operating pressure line 16 connected to the clutch control valve 3 to the pressure chamber 13 of the clutch control cylinder 2, the allocated disconnection type clutch is engaged and disengaged by the depressurization of the pressure chamber 13. By adjusting a mean operating pressure P_K in the pressure chamber 13 the disconnection type clutch can additionally be kept in a slip state.

The clutch control valve 3 is constructed hydraulically controllable and has on one side a valve piston 22 acted upon by a valve spring 21 as well as an additional piston 23 that is mounted floating on the front side facing away from the spring. A central pressure chamber 24 of the clutch control valve 3 is connected on the spring side with a controllable, i.e. throttleable by the control edge of an adjacent piston collar of the valve piston 22, connection of a supply pressure connection line 25, provided concentrically with a connection for an operating pressure line 16 leading to the pressure chamber 13 of the clutch control cylinder 2, and facing away from the spring with a controllable connection of a depressurized line, not shown in detail, leading to an oil sump.

The control function of the clutch control valve 3 and damping of oscillations of the valve piston 22 are accomplished by the return of the operating pressure P_K via a return line 26 connected to the operating pressure line 16 to a front-side pressure chamber 27 containing the valve spring 21.

By means of the connection of a control pressure line 28 connected to the pilot valve 4, conveying a pilot pressure P_Vst during normal operation to a pressure chamber 29 receiving the front side of the valve piston 22 facing away from the spring, the valve piston 22 is acted upon by the pilot pressure P_Vst for adjusting a proportional operating pressure P_K.

By means of the connection of a control pressure connection line 30 connected to the emergency valve 7 conveying during emergency operation an emergency pressure P_Not to a pressure chamber 31 receiving the front-side of the additional piston 23 facing away from the spring, the valve piston 22 is additionally acted upon in the opening direction by a control force for the emergency actuation of the clutch control cylinder 2 and/or of the allocated disconnection type clutch.

The pilot valve 4 is constructed as a 3/2-way solenoid control valve 32 with a connection of a control pressure supply line 33 conveying a reduction pressure P_Red, a connection of the control pressure line 28 leading to the dutch control valve 3, and a connection of a depressurized line, which is not shown in detail. The pilot pressure P_Vst adjusted via the pilot valve 4 by means of an electrical control current is proportionally converted to the operating pressure P_K for actuating the corresponding disconnection type clutch via the clutch control cylinder 2. In case of a disturbance, in particular in an allocated electronic transmission control, the pilot valve 4 is disconnected, i.e. depressurized, and thus the control pressure line 28 is depressurized by means of the connection to the depressurized line.

The reduction pressure P_Red available in the control pressure supply line 33 is essentially provided for control purposes and is highly stable for this purpose. The reduction pressure P_Red is adjusted by means of the pressure reduction valve 6, which is constructed hydraulically controllable and has a valve piston 35 that can be acted upon on one side by a valve spring 34. A concentric pressure chamber 36 of the pressure reduction valve 6 is provided with a controllable connection of a depressurized line, which is not shown in detail, concentrically with a connection of the control pressure supply line 33, and facing away from the spring with a controllable connection of a connection line 37 conveying the supply pressure P_V1. The control function of the pressure reduction valve 6 and damping of oscillations of the valve piston 35 are accomplished by the return of the reduction pressure P_Red via a return line 38 connected to the control pressure supply line 33 to a front-side pressure chamber 39 containing the valve spring 34.

The self-retaining valve 5 is hydraulically controllable and has a valve piston 42 that can be acted upon on one side by the valve spring 41. A concentric pressure chamber 43 of the self-retaining valve 5 is provided on the spring side with a controllable connection of a supply line 44 conveying the supply pressure P_V1, concentrically with a connection to the supply pressure connection line 25 leading to the clutch control valve 3, and on the side facing away from the spring with a controllable connection to a depressurized line, which is not shown in detail. A further concentric pressure chamber 45 is provided with a connection of a control pressure line 46 to the operation switch actuator 9, whereby this control pressure line also conveys a control pressure P_Nor during normal operation. A front side pressure chamber 48 containing the valve spring 41 has a connection of a switching pressure line 49 leading to the disconnection actuator 8.

A front side pressure chamber 50 facing away from the valve spring 41 is provided with a closable connection of a control pressure line 52 conveying a rotational speed-dependent control pressure P_D by means of a control edge of an adjacent piston collar 51 on the spring side. A connection line 53 branching off the control pressure line 52 leads to a further concentric pressure chamber 54 of the self-retaining valve 5, which, facing away from the spring, is provided with a controllable connection of a depressurized line, which is not shown in detail, and is also used for discharging the rotational speed-dependent pressure p_D when the connection of the front-side pressure chamber 50 is locked.

By activating the operation switch actuator 9, the control pressure line 46 conveys the reduction pressure P_Red largely corresponding to the control pressure P_Nor during normal operation. For this purpose, the operation switch actuator 9 is constructed in the present description as a hydraulic solenoid control valve 55, for example as a 3/2-way control valve, with a connection of the control pressure supply line 33, with a connection of the control pressure line 46 leading to the self-retaining valve 5, and with a connection of a depressurized line, which is not shown in detail, by means of which the control pressure line 46 can be connected to the depressurized line in the power-off state, and with the control pressure supply line 33 in the state with power supplied.

Owing to the larger active surface of the piston collar 47 on the spring side, the valve piston 42 of the self-retaining valve 5 is displaced by means of the control pressure P_Nor against the restoring force of the valve spring 41 to an operating position, in which the connection of the supply line 44 to the supply pressure connection line 25 is open. Consequently the supply pressure P_V1 at the clutch control valve 3 is available for adjusting the operating pressure P_K.

If a disturbance occurs which causes the shutdown of the operation switch actuator 9 and in consequence loss of the control pressure P_Nor, the valve piston 42 will be kept in its operating position via the rotational speed-dependent control pressure P_D acting on the side facing away from the spring on the local front-side piston collar 51 as long as the underlying speed is sufficiently high. In case, however, of a drop in the corresponding speed, and consequently also in the rotational speed-dependent control pressure P_D below a predetermined threshold value, the valve piston 42 is displaced by the return spring 41 to its idle position, in which the connection of the supply line 44 to the supply line connection line 25 is locked and the supply pressure connection line 25 is depressurized, and the supply pressure P_V1 at the clutch control valve 3 is thus no longer available.

The rotational speed-dependent control pressure P_D usually is proportional to the speed of the drive motor or to the speed of the output shaft of the step-by-step variable speed transmission, so that onward driving in emergency operation at sufficiently high motor speed or at a sufficiently high driving speed is possible. When the motor speed is too low or the driving speed is too low, the disconnection type clutch is, however, forceably disengaged by shutting off the supply pressure P_V1, as a result of which the drive motor is prevented from stalling, and coasting of the vehicle can at least still be acted upon by the driver to a limited extent.

By acting upon the spring side pressure chamber 48 of the self-retaining valve 5 with a switch-off pressure P_Abs conveyable by the switching pressure line 49, the valve piston 42 can, however, be securely placed in its idle position with its then relieved spring 41 and kept in that position by actuating a switch-off actuator 8 independently of the momentary operating state of the self-retaining valve 5.

For this purpose, the disconnection actuator 8 is constructed in the present description as a hydraulic solenoid switching valve 56, for example as a 3/2-way switching valve, with a connection of the control pressure supply line 33, with a connection of the switching pressure 49 connected to the spring-side front-side pressure chamber 48 of the self-retaining valve 5, and with a connection of a depressurized line, which is not shown in detail, by means of which the control pressure line 49 is connected to the depressurized line in the power-off state, and connected to the control pressure supply line 33 in the powered state.

By activating the disconnection actuator 8, the allocated disconnection type clutch is thus reliably disengaged by locking the supply line 44 and depressurizing the supply pressure connection line 25 by means of the valve piston 41 of the self-retaining valve 5, or in case the disconnection type clutch is already in the disengaged state, it is kept disengaged. In this operating state, engaging a gear with disengaged idle position N is possible, as a result of which the sequence of an impending shifting process can be considerably accelerated.

If a disturbance leading to switching off the switch-off actuator occurs in this operating phase, the valve piston 42 of the self-retaining valve 5 cannot return to its operating position because on the one hand, the control pressure P_Nor is not available due to the likewise switched off operation switch actuator 9, and on the other hand, the rotational speed-dependent control pressure P_D can no longer reach the front side pressure chamber 50 due to the locking embodiment of the corresponding connection and to the front side piston collar 51 facing away from the spring. The corresponding disconnection type clutch thus subsequently remains reliably open during a disturbance while the switch-off valve is activated.

If the disturbance has already occurred when the control device 1.1 is already in emergency operation, the disconnection actuator 8 can no longer be actuated. Thus, the above described possibility of engaging a gear with disengaged idle drive position N is no longer available.

The emergency valve 7 and the operation switch actuator 9 are provided for activating emergency operation the emergency valve 7 is constructed pressure-controlled and has a valve piston 62 that can be acted upon on one side by the valve spring 61. A concentric pressure chamber 63 has a controllable connection of a depressurized line, which is not shown in detail, on the spring side, concentrically a connection for the control pressure supply line 30 leading to the pressure chamber 31 of the clutch control valve 3 receiving the front side of the additional piston 23 facing away from the spring. A front side pressure chamber 65 facing away from the valve spring 61 is restricted by an active surface of a spring-side adjacent piston collar 66 of the valve piston 62 and has a connection of a control pressure line 67 branching off the control pressure line 46.

During normal operation the control pressure line 46 and consequently also the control pressure line 67 conveys the reduction pressure P_Red largely corresponding to the control pressure P_Nor. The valve piston 62 of the emergency valve 6 is displaced against the restoring force of the valve spring 61 by the control pressure P_Nor to an operating position, in which the connection of the control pressure supply line 64 to the control pressure connection line 30 leading to the clutch control valve 3 is interrupted and the control pressure connection line 30 is depressurized.

If a disturbance occurs which causes the shutdown of the operation switch actuator 9 and in consequence the omission of the control pressure P_Nor, the valve piston 42 is placed in its idle position by the restoring force of the valve spring 61, in which the control pressure supply line 64 is connected to the control pressure supply line 30. Thus, the valve piston 22 of the clutch control valve 3 is displaced against the restoring force of the valve spring 21 via the additional front side piston 23 facing away from the spring acted upon by reduction pressure P_Red consequently converted to control pressure P_Not, or kept in this position.

As in this operating position of the valve piston 22 the connection of the supply pressure connection line 25 to the operating pressure line 16 is open in the clutch control valve 3, the allocated disconnection type clutch is engaged and/or kept engaged by the pressurization of the pressure chamber 13 of the clutch control cylinder 2 with the operating pressure P_K adjusted this way, as long as the supply pressure P_V1 is passed on via the self-retaining valve 5 from the supply line 44 to the supply pressure connection line 25. As already described above, the latter occurs when, on the one hand a sufficiently high rotational speed of the drive motor or of the output shaft of the step-by-step variable speed transmission is available, and thus the self-retaining valve 5 is acted upon with a sufficiently high rotational speed-dependent control pressured P_D, as well as when on the other hand, the disconnection actuator 8 is not activated, and thus the self-retaining valve 5 is not acted upon with the disconnection pressure P_Abs.

Figure 2:
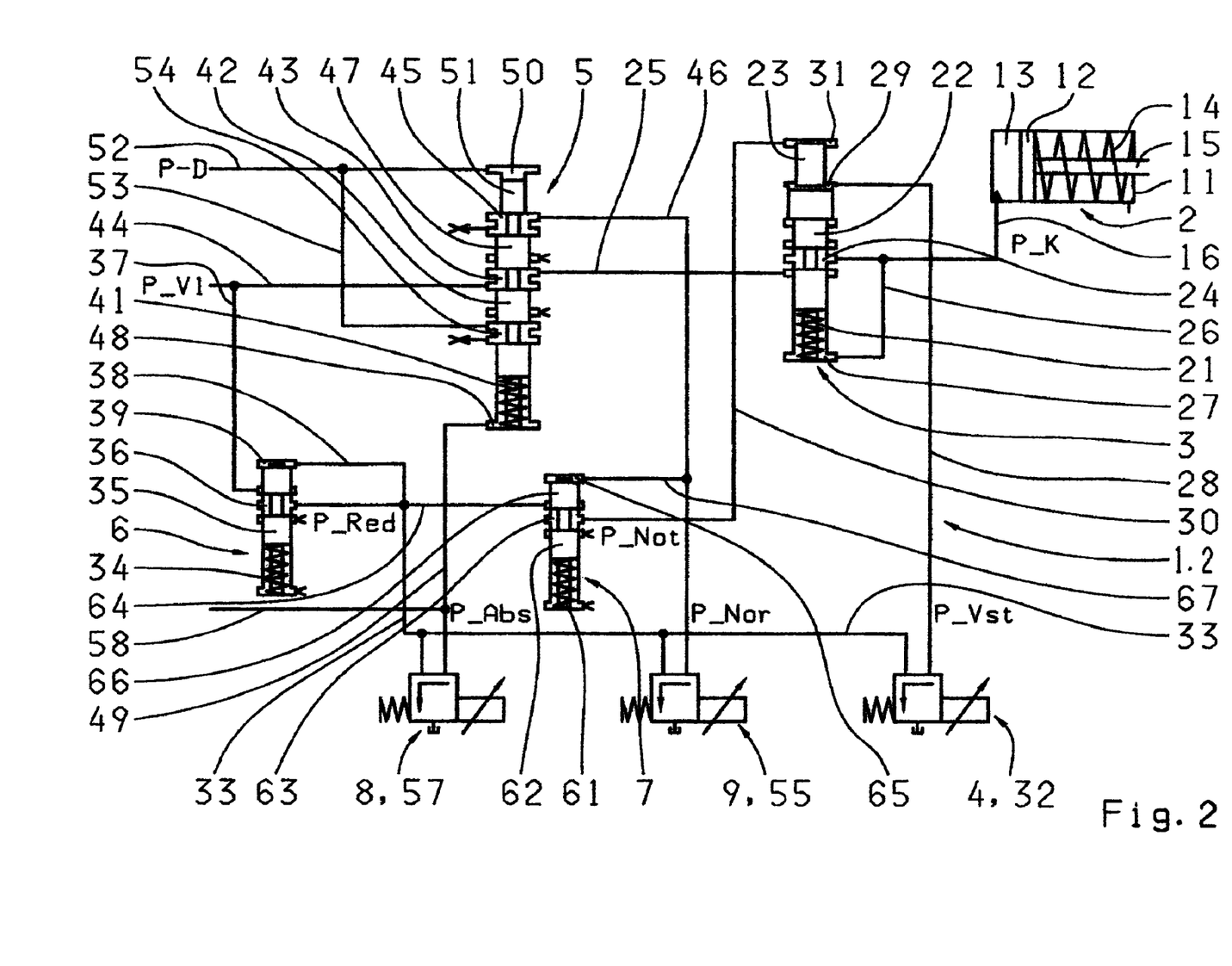
FIG. 2 shows a slightly modified control device compared to the embodiment according to FIG. 1 for controlling the single disconnection type clutch.

A hydraulic control device 1.2 in accordance with the invention according to FIG. 2 has only been slightly modified compared to the above described embodiment according to FIG. 1. By contrast, the disconnection actuator 8 is now constructed in the present description as a hydraulic solenoid control valve 57, for example as a 3/2-way control valve or as a 3/3-way control valve, with a connection of the control pressure supply line 33, with a connection of the switching pressure 49 connected to the spring-side front-side pressure chamber 48 of the self-retaining valve 5, and with a connection of a depressurized line, which is not shown in detail, by means of which the control pressure line 49 is connected to the depressurized line in the power-off state, and can be connected to the control pressure supply line 33 in the state with power supplied.

By activating this disconnection actuator 8, 57 with sufficiently high electrical control current, the allocated disconnection type clutch is thus reliably disengaged or kept disengaged if it is already in the disengaged state. An additional switching pressure line 58 is connected to the switching pressure line 49 that leads to the switching control element, which is not shown in detail. The switching pressures of the self-retaining valve 5 and of the other switching control element are conveniently of different height in this case, so that both switching control elements can be actuated in series by the solenoid control valve 57.

Figure 3:
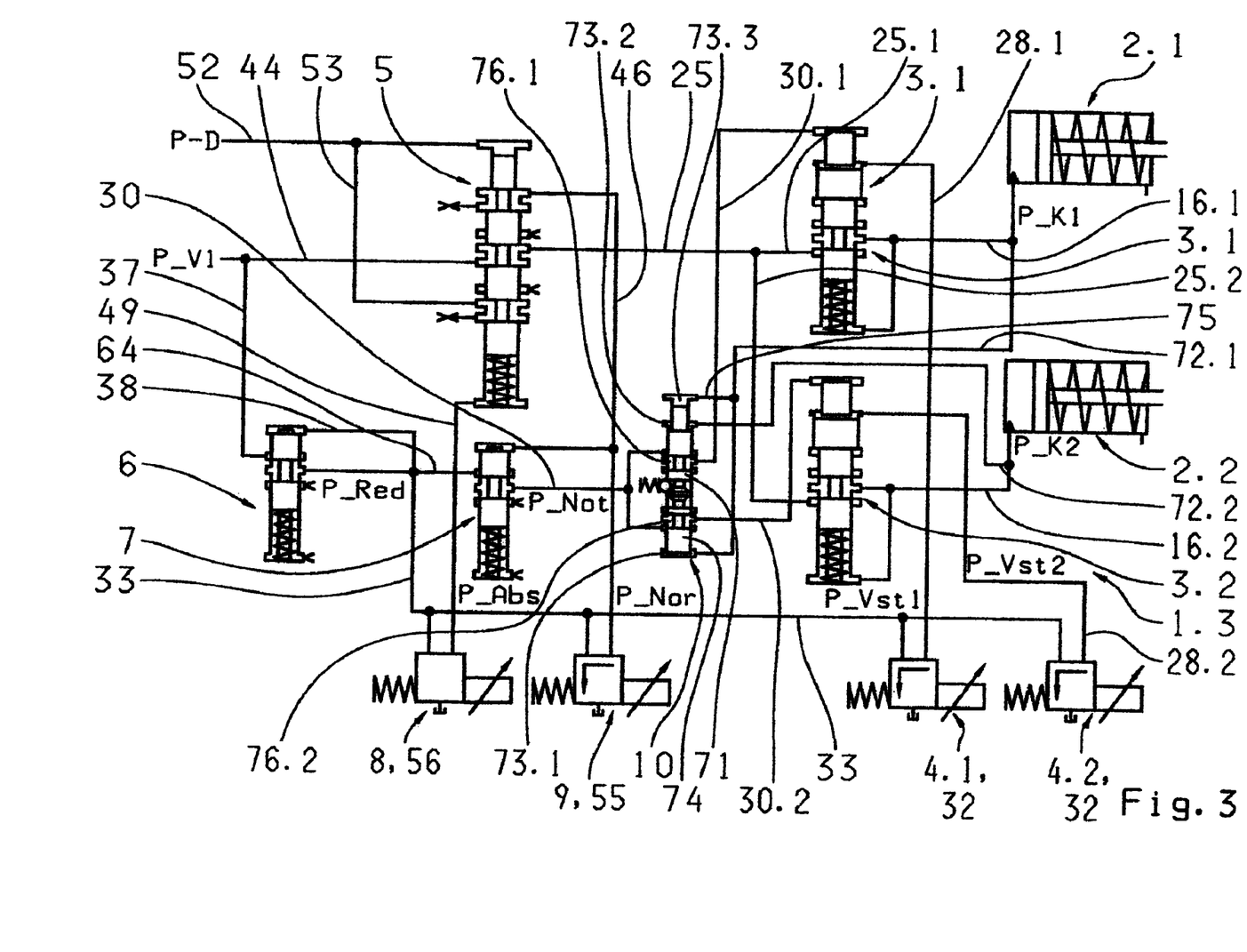
FIG. 3 shows an alternative embodiment of a control device according to the present invention for the combined control of two disconnection type clutches and FIG. 4 shows a further, alternative control device compared to the design according to FIG. 3 for the combined control of two disconnection type clutches.

A hydraulic control device 1.3 of the invention according to FIG. 3 with in principle similar execution and same functional context according to FIG. 1 is in contrast provided and executed for the combined control of two disconnection type clutches, in particular of both disconnection type clutches of a dual-clutch transmission. Both disconnection type clutches can be activated in the above described manner via a clutch control cylinder 2.1, 2.2 in each case, which can respectively be controlled by means of an allocated clutch control valve 3.1, 3.2 and a control valve connected upstream of pilot valves 4.1, 4.2.

At the control pressure supply lines 30.1, 30.2, a common pressure-controlled clutch selector valve 10 is connected upstream of the clutch control valves 3.1, 3.2. The clutch selector valve 10 is provided with a spring centered valve piston 71, which is acted upon in the opposite effective direction with the operating pressures P_K1 and/or P_K2 of the pressure chambers 13 of both clutch control cylinders 2.1, 2.2. For this purpose, the operating pressures P_K1 and P_K2 are respectively introduced in the corresponding pressure chambers 73.1, 73.2 of the clutch selector valve 10 via a connection line 72.1, 72.2 connected to the operating pressure line 16.1, 16.2 of the respective clutch control cylinder 2.1, 2.2.

Moreover, the operating pressure P_K1 of the first clutch control cylinder 2.1 is directed via a connection line 75 to a further pressure chamber 73.3 with opposite effective direction onto the valve piston 71. As the active surface of the spring side piston collar 74 of the valve piston 71 is, however, larger in the first pressure chamber 73.1 than the active surface of the piston collar at the other axial end of the valve piston 31 in the third pressure chamber 73.3, the effective direction of the control force of the operating pressure P_K1 is determined by the first pressure chamber 73.1 and the active surface of the piston collar 74 there.

Besides, the clutch selector valve 10 has two pressure chambers 76.1 and 76.2, which each have an axial outer controllable connection to the control pressure connection line 30 conveying the emergency pressure P_Not in emergency operation, and respectively an inner controllable connection to a depressurized line, and respectively in between a connection for the control pressure connection line 30.1, 30.2 leading to the allocated clutch control valves 3.1 and 3.2. In this case, the connections of the control pressure connection lines 30.1 and 30.2 are disposed axially on the side determined by the effective direction of the allocated operating pressures P_K1, P_K2.

The clutch selector valve 10 ensures that the reduction pressure P_Red available in case of a disturbance, i.e. conveyed by the emergency valve 8 as emergency control pressure P_Not, is only conveyed to the clutch control valve 3.1 or 3.2 of the disconnection type clutch that is still closed at the moment of the disturbance so that this disconnection type clutch is engaged or kept engaged, and the other disconnection type clutch is disengaged. By using the clutch selector valve 10, the use of at least a self-retaining valve 5 as well as an emergency valve 7 per disconnection type clutch is thus avoided, and besides, simultaneous engagement of both disconnection type clutches in emergency operation is reliably prevented.

Figure 4:
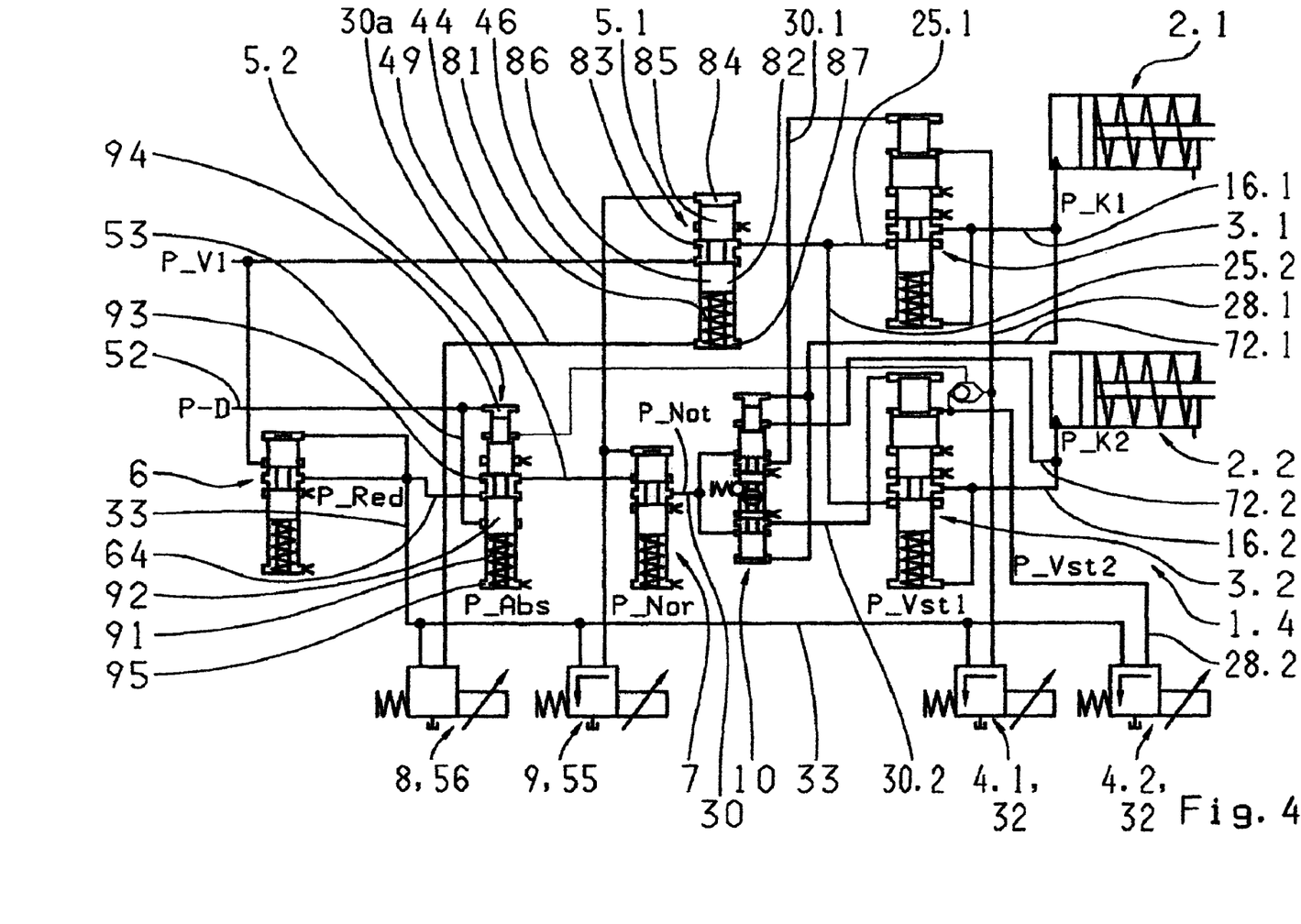

A further hydraulic control device 1.4 of the invention according to FIG. 4 is likewise provided for the combined control of two disconnection type clutches, in particular of both disconnection type clutches of a dual-clutch transmission, and, with largely the same operating mode, is executed similarly to the control device 1.3 according to FIG. 3. In contrast, however, in the embodiment according to FIG. 4 instead of a single, relatively complex and correspondingly expensive self-retaining valve 5, two relatively simple as well as cost-effectively executed self-retaining valves 5.1 and 5.2 are provided.

The first self-retaining valve 5.1 is constructed as pressure-controlled and has a valve piston 82 that can be acted upon on one side by the valve spring 81. A concentric pressure chamber 83 of the self-retaining valve 5.1 has a controllable connection on the spring side for the supply line 44 conveying the supply pressure P_V1, concentrically a connection of the supply pressure connection lines 25.1 and 25.2 leading to both clutch control valves 3.1 and/or 3.2, and facing away from the spring a controllable connection of a depressurized line, which is not shown in detail.

A front side pressure chamber 84 facing away from the valve spring 81 has a connection of a control pressure line 46 conveying the control pressure P_Nor and connected to the operation switching actuator 9 that is controllable by the control edge of a piston collar 85 adjacent on the spring side. The concentric pressure chamber 83 is restricted on the spring side by a larger active surface of an adjacent piston collar 86 than on the side facing away from the spring, as a result of which the self-retaining function of the self-retaining valve 5.1 with switched off operation switching actuator 9 and the consequently omitted control pressure P_Nor is given in emergency operation.

An axially opposite-lying front side pressure chamber 87 containing the valve spring 81 is provided with a connection of the switching pressure line 49 leading to the disconnection actuator 8. Thus, by activating, i.e. supplying the disconnection actuator 8 with current, the supply of both clutch control valves 3.1 and 3.2 can be interrupted with the supply pressure P_V1 in the already described manner. By activating the disconnection valve 8, the spring side front side pressure chamber 87 is acted upon with the switching off pressure P_Abs largely corresponding to the reduction pressure P_Red, and thus the valve piston 81 is displaced to its idle position, in which the connection of the supply line 44 to the supply pressure connection lines 25.1 and 25.2 is locked.

As the supply of the control pressure P_Nor in the front side pressure chamber 84 facing away from the spring of the first self-retaining valve 5.1 is not completely closable by the adjacent piston collar 85, during normal operation, i.e. when the operation switch actuator 9 is not switched off, the valve piston 81 is pushed back to its operating position after the disconnection actuator 8 is switched off as well as after the related omission of the switching off pressure P_Abs, and thus the supply pressure P_V1 is again conveyed to the clutch control valves 3.1 and/or 3.2.

The second self-retaining valve 5.2 is likewise pressure-controlled and has a valve piston 92 that can be acted upon on one side by the valve spring 91. A concentric pressure chamber 93 of the self-retaining valve 5.2, via which a control pressure connection line 30a branching off the control pressure supply line 33 and control pressure connection line 64 conveying the reduction pressure P_Red can be connected with a section of the control pressure supply line 64 leading to the emergency valve 7, has a controllable connection of the control pressure supply line on the spring side, concentrically a connection of the control pressure connection line 30a and a controllable connection of a depressurized line, which is not shown in detail, facing away from the spring.

A front side pressure chamber 94 facing away from the valve spring 91 has a controllable connection of a control pressure line 52 conveying the rotational speed-dependent control pressure P_D. An end side pressure chamber 95 containing the valve spring 91 has a controllable connection of a connection line 53 branching off the control pressure line 52 and a connection disposed end side in the pressure chamber 95 of a depressurized line, which is not shown in detail, as a result of which the rotational speed-dependent pressure P_D is discharged to an oil pan with a valve piston 92 in idle position, and thus nearly locked connection of the front side pressure chamber 94.

The reduction pressure P_Red is passed through to the emergency valve 7 by means of the second self-retaining valve 5.2 as long as the speed underlying the rotational speed-dependent control pressure P_D exceeds a predetermined threshold value and thus keeps the valve piston 91 in an operating position, in which the connection of the control pressure supply line 64 to the control pressure connection line 30a is open. During normal operation, i.e. with available control pressure P_Nor, the conveyance of the reduction pressure P_Red through the valve piston 62 of the emergency valve 7 is blocked off.

In case of a disturbance, i.e. in case the control pressure P_Nor is not available, the corresponding connection in the emergency valve 7 is opened. The reduction pressure P_Red then acting as emergency pressure P_Not is, however, only available at a sufficiently high speed of the drive motor or of the output shaft of the step-by-step variable speed transmission (and/or sufficiently high pressure P_D) due to the front side pressurization of the valve piston 92 of the second self-retaining valve 5.2, so that only in this case the emergency pressure P_Not is conveyed to one of the clutch control valves 3.1 or 3.2 via the clutch control valve 10, and thus the allocated disconnection type clutch is engaged. Thus, both self-retaining valve 5.1 and 5.2 together approximately fulfill the same scope of functions as the embodiments of a single self-retaining valve 5 previously described in connection with FIG. 3, which, however, is executed in a considerably more complex manner.

REFERENCE NUMERALS 1.1 hydraulic control device
1.2 hydraulic control device
1.3 hydraulic control device
1.4 hydraulic control device
2 clutch control cylinder
2.1 dutch control cylinder
2.2 dutch control cylinder
3 dutch control valve
3.1 clutch control valve
3.2 dutch control valve
4 pilot valve
4.1 pilot valve
4.2 pilot valve
5 self-retaining valve
6 pressure reduction valve
7 emergency valve
8 disconnection actuator
9 operation switch actuator
10 clutch selector valve
11 cylinder barrel
12 piston
13 pressure chamber
14 return spring
15 piston rod
16 operating pressure line
16.1 operating pressure line
16.2 operating pressure line
21 valve spring
22 valve piston
23 additional piston
24 pressure chamber
25 supply pressure connection line
25.26 supply pressure connection line
25.27 supply pressure connection line
26 return line
27 pressure chamber
28 control pressure line
28.29 control pressure line
28.30 control pressure line
29 pressure chamber
30 control pressure connection line
30.1 control pressure connection line
30.2 control pressure connection line
30a control pressure connection line
31 pressure chamber
32 solenoid control valve
33 control pressure connection line
34 valve spring
35 valve piston
36 pressure chamber
37 connection line
38 return line
39 pressure chamber
41 valve spring
42 valve piston
43 pressure chamber
44 supply line
45 pressure chamber
46 control pressure line
47 piston collar
48 pressure chamber
49 switching pressure line
50 pressure chamber
51 piston collar
52 control pressure line
53 connection line
54 pressure chamber
55 solenoid control valve
56 solenoid switching valve
57 solenoid control valve
58 switching pressure line
61 valve spring
62 valve piston
63 pressure chamber
64 control pressure connection line
65 pressure chamber
66 piston collar
67 control pressure line
71 pressure chamber
72.1 connection line
72.2 connection line
73.1 pressure chamber
73.2 pressure chamber
73.3 pressure chamber
74 piston collar
75 connection line
76.1 pressure chamber
76 pressure chamber
81 valve spring
82 valve piston
83 pressure chamber
84 pressure chamber
85 piston collar
86 piston collar
87 pressure chamber
91 valve spring
92 valve piston
93 pressure chamber
94 pressure chamber
95 pressure chamber
P_Abs switch-off pressure
P_Abs_max maximum switch-off pressure
P_D rotational speed dependent control pressure
P_K operating pressure
P_K1 operating pressure
P_K2 operating pressure
P_Nor control pressure
P_Not emergency control pressure
P_Red reduction pressure
P_Vst pilot pressure
P_Vst1 pilot pressure
P_Vst2 pilot pressure
P_V1 supply pressure

The invention claimed is:

1. A pressure medium-actuated control device (1.1, 1.2, 1.3, 1.4) of an automated step-by-step variable speed transmission with an actuatable clutch control valve (3, 3.1 3.2) for controlling a control clutch cylinder (2, 2.1, 2.2) of an actively closable decoupler type clutch disposed in a flow of power between a drive motor and an input shaft of the step-by-step variable speed transmission, a self-retaining valve (5) disposed in a pressure supply of the clutch control valve (3, 3.1, 3.2) for rotational speed-dependent emergency actuation of the decoupler type clutch, an electrically selectable disconnection actuator (8) being constructed and operatively connected to the self-retaining valve (5) such that a valve piston (42), of the self-retaining valve (5), is movable into an idle position locking the pressure supply of the clutch control valve (3, 3.1, 3.2) in powered state of the disconnection actuator (8), and into an operating position determined by applied control pressures in an unpowered state of the disconnection actuator (8), the disconnection actuator (8) being a hydraulic solenoid switching valve (56) having a connection with a control pressure supply line (33) conveying reduction pressure (P_Red), having a connection with a switching pressure line (49) to a spring-side front-side pressure chamber (48) of the self-retaining valve (5), containing a valve spring (41), and having a connection with a depressurized line, by which the switching pressure line (49) is connected to the depressurized line, in the unpowered state of the disconnection actuator (8), and to the control pressure supply line (33) in the powered state of the disconnection actuator (8), the self-retaining valve (5) having a concentric pressure chamber (43) which, on a spring side, has a controllable connection with a supply line (44) conveying a supply pressure (P_V1), and the concentric pressure chamber (43) having a connection to a supply pressure connection line (25) leading to a supply connection with the clutch control valve (3), and which on a side facing away from the spring has a controllable connection with a depressurized line, and with a further concentric pressure chamber (45), which has a connection with a control pressure line (46) conveying a control pressure (P_Nor) during normal operation and which on the spring side is restricted by a larger active surface of an adjacent piston collar (47) than on the side facing away from the spring, and the spring-side front-side pressure chamber (48) containing the valve spring (41), and the spring-side front-side pressure chamber (48) has a connection with the switching pressure line (49) leading to the switch-off actuator (8), and a front-side pressure chamber (50) of the self-retaining valve (5) facing away from the valve spring (41), which has a connection with a control pressure line (52) conveying a rotational speed-dependent control pressure (P_D) which is closable via a control edge of a piston collar (51) adjacent on the spring side.

2. The control device according to claim 1, wherein the self-retaining valve (5) has a further concentric pressure chamber, via which a control pressure supply line (64) conveying the reduction pressure (P_Red), is connected to a front-side pressure chamber (31) of the clutch control valve (3) facing away from a valve spring (21) and with a control pressure connection line (30a, 30, 30.1, 30.2) provided with a locking element (7), the pressure chamber having a controllable connection with the control pressure supply line (64) on the spring side, concentrically a connection with the control pressure connection line (30, 30a), and facing away from the spring a controllable connection with a depressurized line.

3. The control device according to claim 2, wherein the locking element constructed as a pressure-controlled emergency valve (7) is provided with a concentric pressure chamber (63), which on a spring side has a controllable connection with a depressurized line, which concentrically has a connection with the control pressure connection line (30, 30.1, 30.2) leading to the clutch control valve (3.3, 0.1, 0.3) and which, facing away from the spring, has a controllable connection with the control pressure line (30a, 64) coming from either the control valve supply line (33) or the self-retaining valve (5), and with a front-side pressure chamber (65) facing away from a valve spring (61) that is restricted by an active surface of a piston collar (66) adjacent on a front side as well as a connection with a control pressure line (67) conveying a control pressure (P_Nor) during normal operation.

4. The control device according to claim 1, wherein two pressure-controlled self-retaining valves (5.1, 5.2) are provided, of which a first self-retaining valve (5.1) is provided with a concentric pressure chamber (83), which has the controllable connection with the supply line (44) conveying the supply pressure (P_V1) on the spring side, which concentrically has a connection with a supply pressure connection line (25, 25.1, 25.2) leading to the supply connection with the clutch control valve (3, 3.1, 3.2), and which, facing away from the spring, has a controllable connection with a depressurized line, the concentric pressure chamber (83) is restricted on the spring side by a larger active surface of an adjacent piston collar (86) than on the side facing away from the spring, as well as with a front side pressure chamber (87) containing a valve spring (81), which has a connection with a switching pressure line (49) leading to the disconnection actuator (8), and with a front side pressure chamber (84) facing away from the valve spring (81), which has a connection with a control pressure line (46) conveying a control pressure (P_Nor) during normal operation that is controllable by a control edge of a piston collar (85) adjacent on the spring side, and of which a second self-retaining valve (5.2) is provided with a concentric pressure chamber (93), via which a control pressure supply line (64) conveying the reduction pressure (P_Red) is connected to a front side pressure chamber (31) facing away from a spring valve (21) of the clutch control valve (3, 3.1, 3.2) and with a control pressure connection line (30a, 30, 30.1, 30.2) provided with a locking element (7), the pressure chamber (93) having a controllable connection with the control pressure supply line (64) on the spring side, concentrically a connection with the control pressure supply line (64), concentrically a connection with the control pressures supply line (30a), and facing away from the spring a controllable connection with the depressurized line, as well as with a front-side pressure chamber (94) facing away from the spring valve (91), which has a controllable connection with control pressure line (52) conveying a rotational speed dependent-control pressure (P_D).

5. The control device according to claim 1, wherein for activation of emergency operation an electrically controllable operation switch actuator (9) is provided, by which the control pressure line (46, 67) conveying the control pressure (P_Nor) to at least one of the self-retaining valve (5, 5.1) and to the emergency valve (7) is supplied with this control pressure (P_Nor) in a powered state of the operation switch actuator (9) and be depressurized in the unpowered state of the operation switch actuator (9).

6. The control device according to claim 5, wherein the operation switch actuator (9) is a hydraulic solenoid switching valve with a connection with the control pressure supply line (33), a connection with a control pressure line (46, 67) of at least one of the self-retaining valve (5, 5.1) conveying the control pressure (P_Nor) during normal operation and the emergency valve (7), and a connection with a depressurized line, by which the control pressure line (46, 67) is connectable to the depressurized line in the unpowered state of the operation switch actuator (9) and to the control pressure supply line (33) in the powered state.

7. The control device according to claim 5, wherein the operation switch actuator (9) is a hydraulic solenoid control valve (55) with a connection with the control pressure supply line (33), a connection with a control pressure line (46, 67) of at least one of the self-retaining valve (5, 5.1) conveying the control pressure (P_Nor) during normal operation and of the emergency valve (7), and a connection with a depressurized line, by means of which the control pressure line (46, 67) is connectable to the depressurized line in the unpowered state of the operation switch actuator (9) and to the control pressure supply line (33) in the powered state.

8. A pressure medium-actuated control device (1.1, 1.2, 1.3, 1.4) of an automated step-by-step variable speed transmission with an actuatable clutch control valve (3, 3.1 3.2) for controlling a control clutch cylinder (2, 2.1, 2.2) of an actively closable decoupler type clutch disposed in a flow of power between a drive motor and an input shaft of the step-by-step variable speed transmission, a self-retaining valve (5) disposed in a pressure supply of the clutch control valve (3, 3.1, 3.2) for rotational speed-dependent emergency actuation of the decoupler type clutch, an electrically selectable disconnection actuator (8) being constructed and operatively connected to the self-retaining valve (5) such that a valve piston (42), of the self-retaining valve (5), being movable into an idle position locking the pressure supply of the clutch control valve (3, 3.1, 3.2) in powered state of the disconnection actuator (8), and into an operating position determined by applied control pressures in an unpowered state of the disconnection actuator (8), the disconnection actuator (8) being a hydraulic solenoid switching valve (56) having a connection with a control pressure supply line (33) conveying reduction pressure (P_Red), having a connection with a switching pressure line (49) to a spring-side front-side pressure chamber (48) of the self-retaining valve (5), containing a valve spring (41), and having a connection with a depressurized line, by which the switching pressure line (49) is connected to the depressurized line, in the unpowered state of the disconnection actuator (8), and to the control pressure supply line (33) in the powered state of the disconnection actuator (8), the self-retaining valve (5) having a concentric pressure chamber (43) which, on a spring side, has a controllable connection with a supply line (44) conveying a supply pressure (P_V1), and the concentric pressure chamber (43) having a connection to a supply pressure connection line (25) leading to a supply connection with the clutch control valve (3), and which on a side facing away from the spring has a controllable connection with a depressurized line, and with a further concentric pressure chamber (45), which has a connection with a control pressure line (46) conveying a control pressure (P_Nor) during normal operation and which on the spring side is restricted by a larger active surface of an adjacent piston collar (47) than on the side facing away from the spring, and the spring-side front-side pressure chamber (48) containing the valve spring (41), and the spring-side front-side pressure chamber (48) has a connection with the switching pressure line (49) leading to the switch-off actuator (8), and a front-side pressure chamber (50) of the self-retaining valve (5) facing away from the valve spring (41), which has a connection with a control pressure line (52) conveying a rotational speed-dependent control pressure (P_D) which is closable via a control edge of a piston collar (51) adjacent on the spring side, wherein the disconnection actuator (8) is a hydraulic solenoid control valve (57) which has a connection with the control pressure supply line (33) conveying the reduction pressure (P_Red), has a connection with the switching pressure line (49) to the spring-side front-side pressure chamber (48) of the self-retaining valve (5) and has a connection with the depressurized line, by which the switching pressure line (49) is connected to the depressurized line in the unpowered state of the disconnection actuator (8) and to the control pressure supply line (33) in the power state of the disconnection actuator (8).

9. The control device according to claim 8, wherein at least a further switching pressure line (58), leading to another hydraulically controllable switching control element, is connected to either the switching pressure line (49) or directly to the connection with the switching pressure line (49) of the solenoid control valve (57), whereby the switching pressures of the self-retaining valve (5) and the other switching control element differing from one another.

10. A pressure medium-actuated control device (1.1, 1.2, 1.3, 1.4) of an automated step-by-step variable speed transmission with an actuatable clutch control valve (3, 3.1 3.2) for controlling a control clutch cylinder (2, 2.1, 2.2) of an actively closable decoupler type clutch disposed in a flow of power between a drive motor and an input shaft of the step-by-step variable speed transmission, a self-retaining valve (5) disposed in a pressure supply of the clutch control valve (3, 3.1, 3.2) for rotational speed-dependent emergency actuation of the decoupler type clutch, an electrically selectable disconnection actuator (8) being constructed and operatively connected to the self-retaining valve (5) such that a valve piston (42), of the self-retaining valve (5), is movable into an idle position locking the pressure supply of the clutch control valve (3, 3.1, 3.2) in powered state of the disconnection actuator (8), and into an operating position determined by applied control pressures in an unpowered state of the disconnection actuator (8), the disconnection actuator (8) being a hydraulic solenoid switching valve (56) having a connection with a control pressure supply line (33) conveying reduction pressure (P_Red), having a connection with a switching pressure line (49) to a spring-side front-side pressure chamber (48) of the self-retaining valve (5), containing a valve spring (41), and having a connection with a depressurized line, by which the switching pressure line (49) is connected to the depressurized line, in the unpowered state of the disconnection actuator (8), and to the control pressure supply line (33) in the powered state of the disconnection actuator (8), the self-retaining valve (5) has a concentric pressure chamber (43) which, on a spring side, has a controllable connection with a supply line (44) conveying a supply pressure (P_V1), and the concentric pressure chamber (43) has a connection to a supply pressure connection line (25) leading to a supply connection with the clutch control valve (3), and which on a side facing away from the spring has a controllable connection with a depressurized line, and with a further concentric pressure chamber (45), which has a connection with a control pressure line (46) conveying a control pressure (P_Nor) during normal operation and which on the spring side is restricted by a larger active surface of an adjacent piston collar (47) than on the side facing away from the spring, and the spring-side front-side pressure chamber (48) containing the valve spring (41), and the spring-side front-side pressure chamber (48) has a connection with the switching pressure line (49) leading to the switch-off actuator (8), and a front-side pressure chamber (50) of the self-retaining valve (5) facing away from the valve spring (41), which has a connection with a control pressure line (52) conveying a rotational speed-dependent control pressure (P_D) which is closable via a control edge of a piston collar (51) adjacent on the spring side, wherein for combined control of two clutch control cylinders (2.1, 2.2) of a dual-clutch transmission, each of the clutch control cylinders (2.1, 2.2) is provided with a clutch control valve (3.1, 3.2), a pressure-controlled clutch selector valve (10) is provided, with a valve piston (71) spring-centered and acted upon in an opposite effective direction with operating pressures (P_K1, P_K2) conveyed via connection lines (72.1, 72.2) of both of the clutch control cylinders (2.1, 2.2), and which has two pressure chambers (73.1, 73.2), which on both outer sides respectively have a controllable connection with the control pressure connection line (30) conveying the emergency pressure (P_Not) in emergency operation, a controllable connection with a depressurized line on an axially inner side, and in between a connection respectively leading via a control pressure connection line (30.1, 30.2) to the front side pressure chamber (31) of one of both clutch control valves (3.1, 3.2) facing away from the valve spring (31), whereby the connections of the control pressure connection lines (30.1, 30.2) are disposed axially on the axial side of the clutch selector valve (10) respectively determined by allocated operating pressures (P_K1, P_K2).

* * * * *